United States Patent [19]
Gray et al.

[11] Patent Number: 6,067,445
[45] Date of Patent: May 23, 2000

[54] DUAL CHANNEL DUAL SPEED FM SUBCARRIER PAGING SYSTEM

[75] Inventors: Kenneth G. Gray, Lake Oswego; Daniel J. Park, Beaverton, both of Oreg.

[73] Assignee: Seiko Communications Systems Inc., Beaverton, Oreg.

[21] Appl. No.: 08/660,146

[22] Filed: Jun. 7, 1996

Related U.S. Application Data

[63] Continuation-in-part of application No. 08/327,256, Oct. 21, 1994, and a continuation-in-part of application No. 08/477,150, Jun. 7, 1995.

[51] Int. Cl.[7] ................................................. H04Q 07/06
[52] U.S. Cl. ........................ 455/45; 455/446; 455/38.1; 455/561; 340/825.44; 370/328; 370/465
[58] Field of Search .................................. 455/38.1, 38.2, 455/446, 45, 466, 456, 561, 403, 422, 313, 334, 450–452; 370/465, 468, 328; 340/825.44

[56] References Cited

U.S. PATENT DOCUMENTS

| | | | |
|---|---|---|---|
| 5,361,399 | 11/1994 | Linquist et al. | 455/456 X |
| 5,434,859 | 7/1995 | Levardon | 370/468 |
| 5,590,405 | 12/1996 | Daly et al. | 455/452 X |
| 5,649,297 | 7/1997 | Park | 455/45 |
| 5,841,806 | 11/1998 | Gilhousen et al. | 455/466 X |

*Primary Examiner*—Fan Tsang
*Assistant Examiner*—Philip J. Sobutka
*Attorney, Agent, or Firm*—Elmer Galbi

[57] ABSTRACT

The effective transmission range of a wireless paging system is varied by changing the transmission data rate. The transmission data rate is lowered in regions with sparse transmitter coverage to increase the effective transmission range of the transmitter. The dual transmission data rates are transmitted either on separate subcarriers on the same FM channel, on the same subcarrier of different FM channels or alternatively on different subcarriers of different FM channels. In a region with dense transmission coverage, the receiver decodes transmission messages at the faster transmission data rate. In regions with sparce transmission coverage, the receiver decodes messages at the slower transmission data rate.

12 Claims, 10 Drawing Sheets

CITY B

CITY A

DUAL CHANNEL DUAL SPEED FM SUBCARRIER PAGING SYSTEM

RELATED APPLICATION

This application is a continuation-in-part of patent application Ser. No. 08/327,256 filed Oct. 21, 1994 and Ser. No. 08/477,150 filed Jun. 7, 1995 both of which are now pending.

BACKGROUND OF THE INVENTION

This invention relates generally to wireless paging systems and more particularly to a system that effectively varies transmission coverage in different regions by varying the transmitted data rate.

Various issued patents and pending applications including U.S. Pat. Nos. 4,713,808 and 4,897,835 (both by Gaskill), U.S. PAt. No. 5,187,470 (King) and pending application Ser. No. 08/046,112, filed Apr. 9, 1993 show systems where digital data is transmitted on an FM subcarrier and modulated on a FM baseband. The data is transmitted to a pager receiver that filters the subcarrier from the rest of the FM baseband and then decodes the data on the subcarrier into digitally encoded messages.

Figure 1:
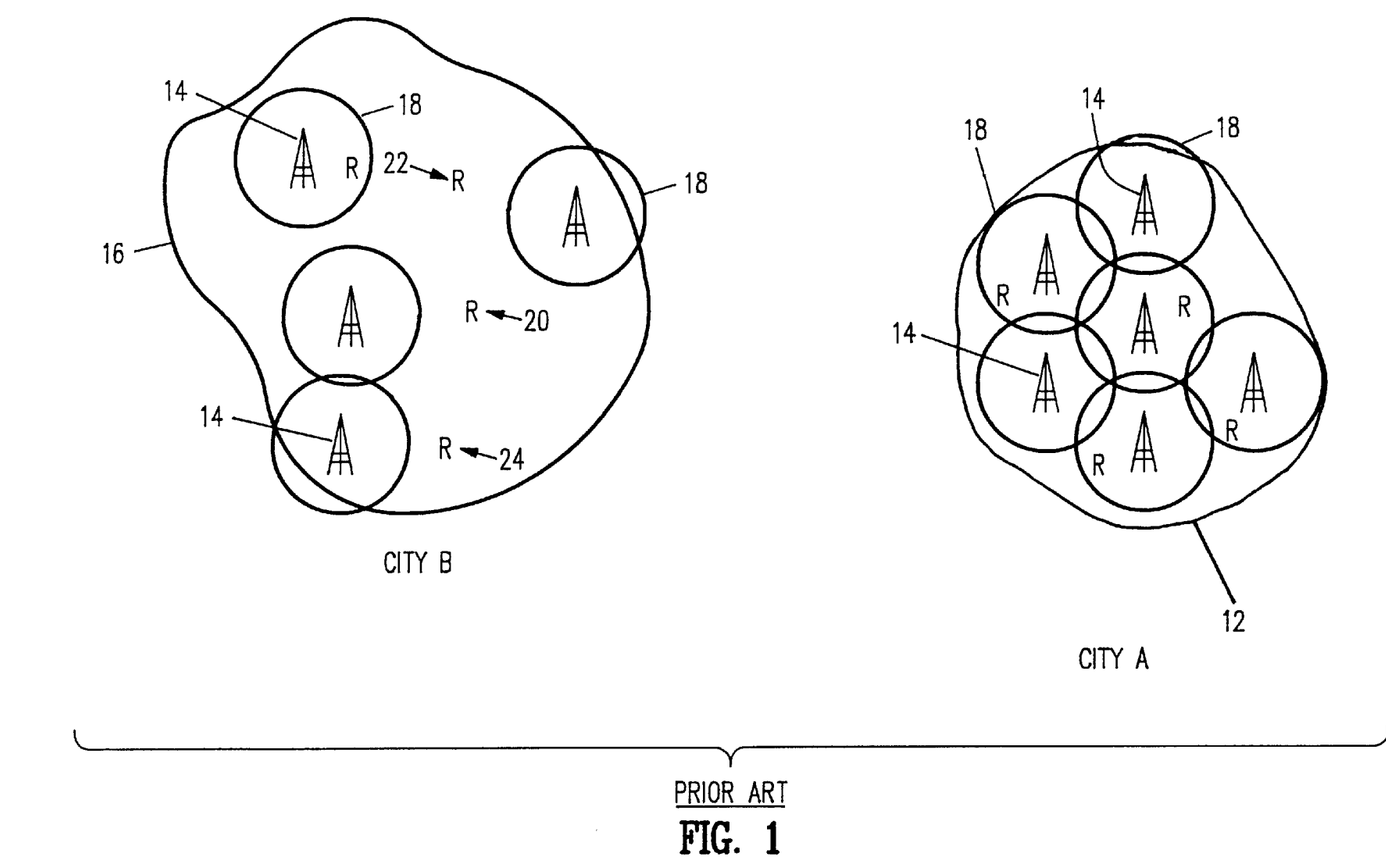
FIG. 1 is a prior art diagram showing two separate coverage regions of a wireless communication system.

FIG. 1 is a diagram showing two different geographical regions identified as region 12 (city A) and region 16 (city B). FM transmitters 14 in both region 12 and region 16 send digitally encoded messages on an FM baseband to portable pagers. The transmitters 14 in region 12 are spaced relatively close together in relation to the transmitters in region 16 and therefore, provide denser transmission coverage than the transmitters in region 16.

To explain further, each transmitter 14 in regions 12 and 16 has an associated transmission range 18. The transmission range is based on a given transmission data rate, transmission power, transmitter height, geographic surroundings, etc. The letters "R" represent receivers (e.g., pager receivers) positioned at different locations within regions 12 and 16.

When receiver "R" is located within range 18 of a transmitter 14, messages can be successfully received from the transmitter. In other words, within range 18 the strength of the transmission signal is sufficient for the receiver to successfully receive messages.

The transmission range for transmitters 14 extend over substantially the entire area in region 12 (i.e., dense transmission coverage). Thus, the receiver "R" can successfully receive paging messages from almost any location in region 12.

The transmission range for transmitters 14 in region 16 extend over only a small portion of the region (i.e., sparse transmission coverage). Thus, there are many locations in region 16 where receiver "R" will not be able to successfully receive messages. For example, no transmitter in region 16 has a range 18 that extends to locations 20, 22 or 24. Thus, receiver "R" cannot successfully receive messages in these locations.

As stated above, the transmission range 18 can be increased by increasing broadcast power. However, digital messages, as described above, are often transmitted on a subcarrier of an FM broadcast channel. Because, the broadcast power for FM stations is often restricted, it is not always possible to increase transmission coverage by increasing the transmitter output power.

Accordingly, a need remains for increasing the effective transmission range for transmitters in regions with sparce transmission coverage.

SUMMARY OF THE INVENTION

The range within which a receiver can successfully receive signals from a transmitter is varied by changing the transmission data rate. The effective transmission range for transmitters is increased in regions with normally sparse transmission coverage to increase the number of locations in the region where signals can be successfully received.

The transmission data rate is lowered in regions with sparse transmitter coverage lowering the minimal signal strength required by the receiver to successfully receive messages. As a result, the effective sensitivity of the receiver is increased increasing the maximum transmission range of the transmitter.

A high data rate is maintained in regions with dense transmitter coverage. Thus, when effective receiver sensitivity is less critical, data can be transmitted at a faster rate allowing for more data capacity.

The information identifying the different transmission data rates is communicated to the receiver by several different methods. In a first method, the subcarrier frequency and the transmission data rate for different transmitters are transmitted in control packets. The receiver decodes subsequent transmitted signals from the identified transmitter at the pre-defined data rate. In a second method, the receiver demodulator contains clock extraction circuitry that automatically locks onto signals at the transmitted data rate.

In one embodiment of the invention, the same message is transmitted on two different subcarriers in the same FM channel. A first subcarrier carries the message at a relatively high data rate and the second subcarrier carries the message at a relatively low data rate. The receiver then demodulates the appropriate subcarrier according to transmission coverage in the given region.

In another embodiment, only one subcarrier on each FM channel carries digital messages while the other subcarrier, if present, may carry non-paging digital data. Messages on the single subcarrier are transmitted at either the high or low data rate again according to transmission cover in the region. The receiver then demodulates the subcarrier at the transmitted data rate appropriate for the given area. In still another embodiment of the invention, different FM channels in the same region contain messages transmitted at different data rates.

A local list sent by each transmitter indicates the transmission frequencies and data rates at which messages are transmitted from each transmitter in the region. The receiver automatically searches for messages at the transmitter frequencies and data rates identified in the local list.

This invention is particularly useful in a communication system designed to (a) operate on a large number of broadcast stations in a large number of geographical regions and (b) which is designed to transmit information to receivers that can receive signals on either one or two channels of the baseband.

The foregoing and other objects, features and advantages of the invention will become more readily apparent from the following detailed description of a preferred embodiment of the invention which proceeds with reference to the accompanying drawings.

DETAILED DESCRIPTION

Figure 2:
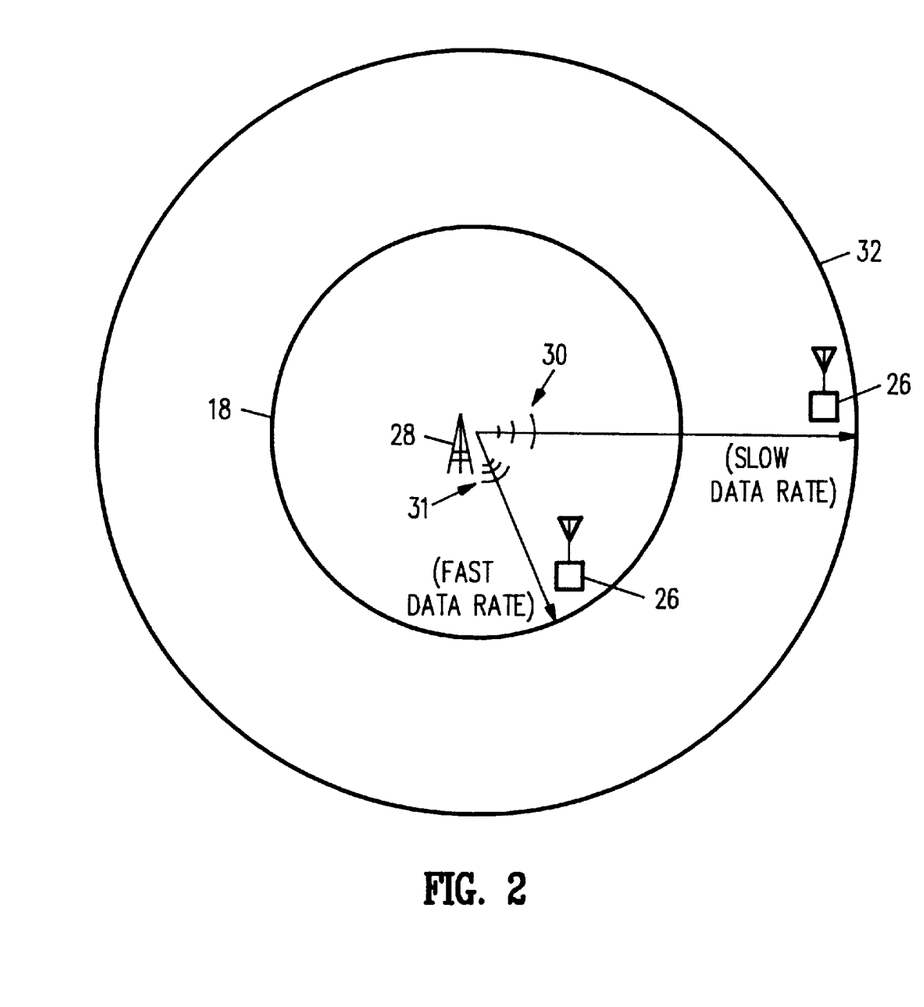
FIG. 2 is a diagram showing a transmitter having an effective variable transmission range according to the invention.

FIG. 2 is a diagram of a system with a variable transmission range that changes according to the transmission data rate. The signals 31 are transmitted at a fast data rate of nineteen thousand bits per second (19 kbps). Signals 30 are transmitted at a slow data rate of 7 kbps.

At a given broadcast power, transmitter height, etc. and at a data rate of 19 kbps, transmitter 28 has a maximum range 18. Thus, receiver 26 must be within range 18 to successfully receive signals from transmitter 28. As described above in FIG. 1, range 18 may be too small to reliably receive messages in regions with sparse transmission coverage (FIG. 1, region 16).

Signal 30 is transmitted at a slower data rate (7 kbps) so that receiver 26 can reliably receive messages over a larger transmission range 32. The slower 7 kbps transmission data rate is used to increase transmission coverage in sparce transmission coverage regions.

At a slower transmission data rate, the noise power is proportionally reduced. Thus, less signal strength is required to successfully extract data from the transmitted signal. An equation relating the data rate to receiver sensitivity is shown below in equation 1.

$$\text{Log } 10(\text{Data Rate}_L / \text{Data Rate}_H) * 10 = \text{gain} \quad \text{(Equation 1)}$$

where

Data Rate$_L$=low transmitted data rate;
Data Rate$_H$=high transmitted data rate;
gain=increase in gain attributed to using slower data rate.

Thus, by slowing the transmission data rate from 19 kbps to 7 kbps, the receiver gain or sensitivity increases by approximately 4.3 decibels. This increased sensitivity allows the transmitter 28 to transmit messages over a larger transmission range 32.

Figure 3:
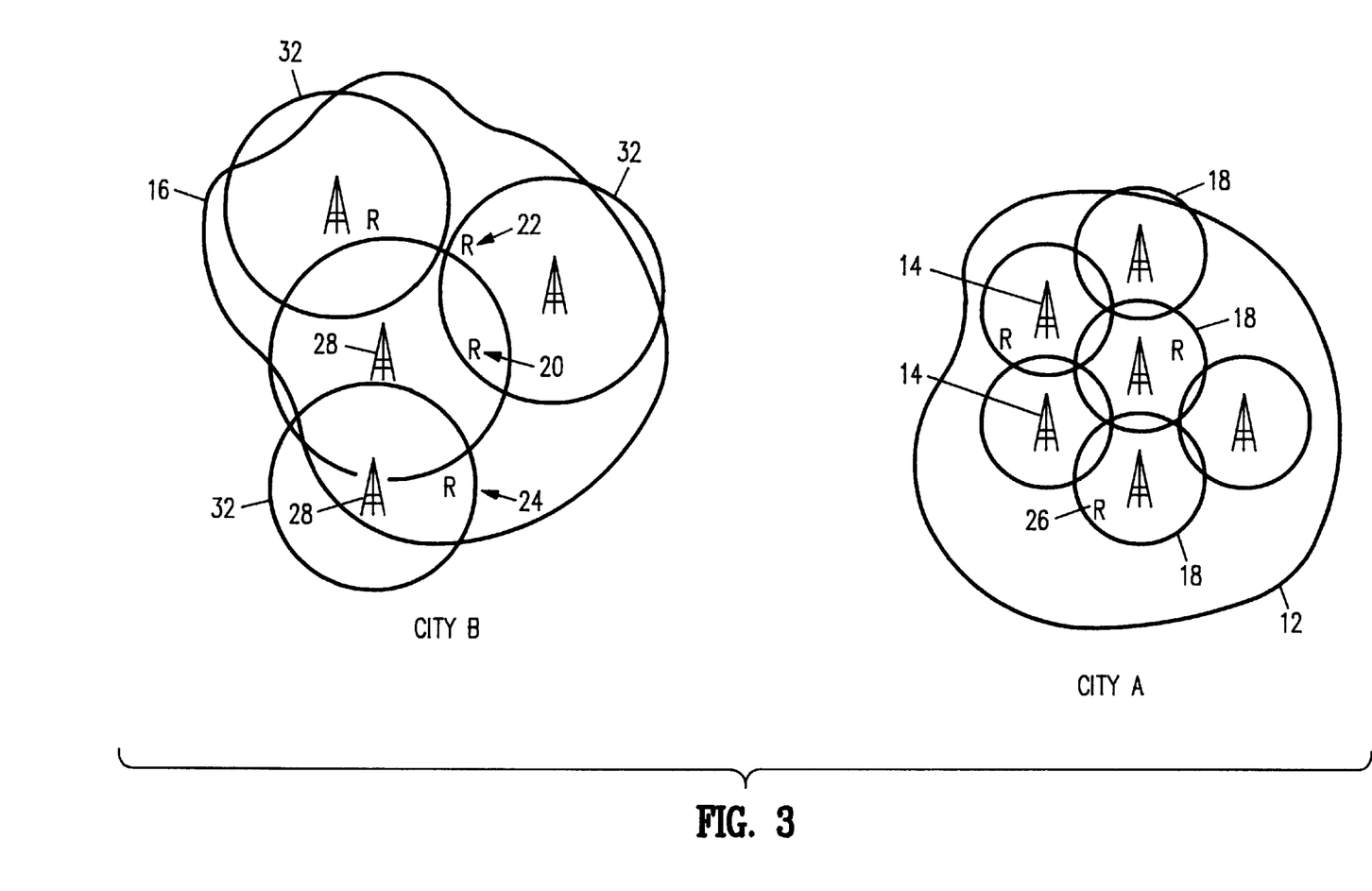
FIG. 3 is a diagram showing the system of FIG. 2 in the two coverage regions previously shown in FIG. 1.

FIG. 3 shows the effect of varying the transmission data rate according to regional transmission coverage. The number of transmitters, the transmitter output power and other physical characteristics for each transmitter in regions 12 and 16 are the same as previously shown in FIG. 1. As described above, there is sufficient coverage in region 12 for the transmitters 14 to operate within the smaller transmission range 18 associated with a 19 kbps transmission data rate.

In region 16 the transmitters 28 transmit messages at the slower data rate of 7 kbps providing an increased transmission range 32. The increased transmission range 32 allows the receiver "R" to move into almost any location in region 16 and still successfully receive messages from at least one transmitter 28. For example, the receiver "R" is now within the transmission range 32 of at least one transmitter 28 when positioned at any of locations 20, 22 or 24.

When the receiver "R" moves back into region 12, the transmission data rate is increased back to 19 kbps. The effective transmission range of the receiver then automatically returns back to range 18. The receiver then processes data at the faster data rate when increased transmission range is not required.

Figure 4:
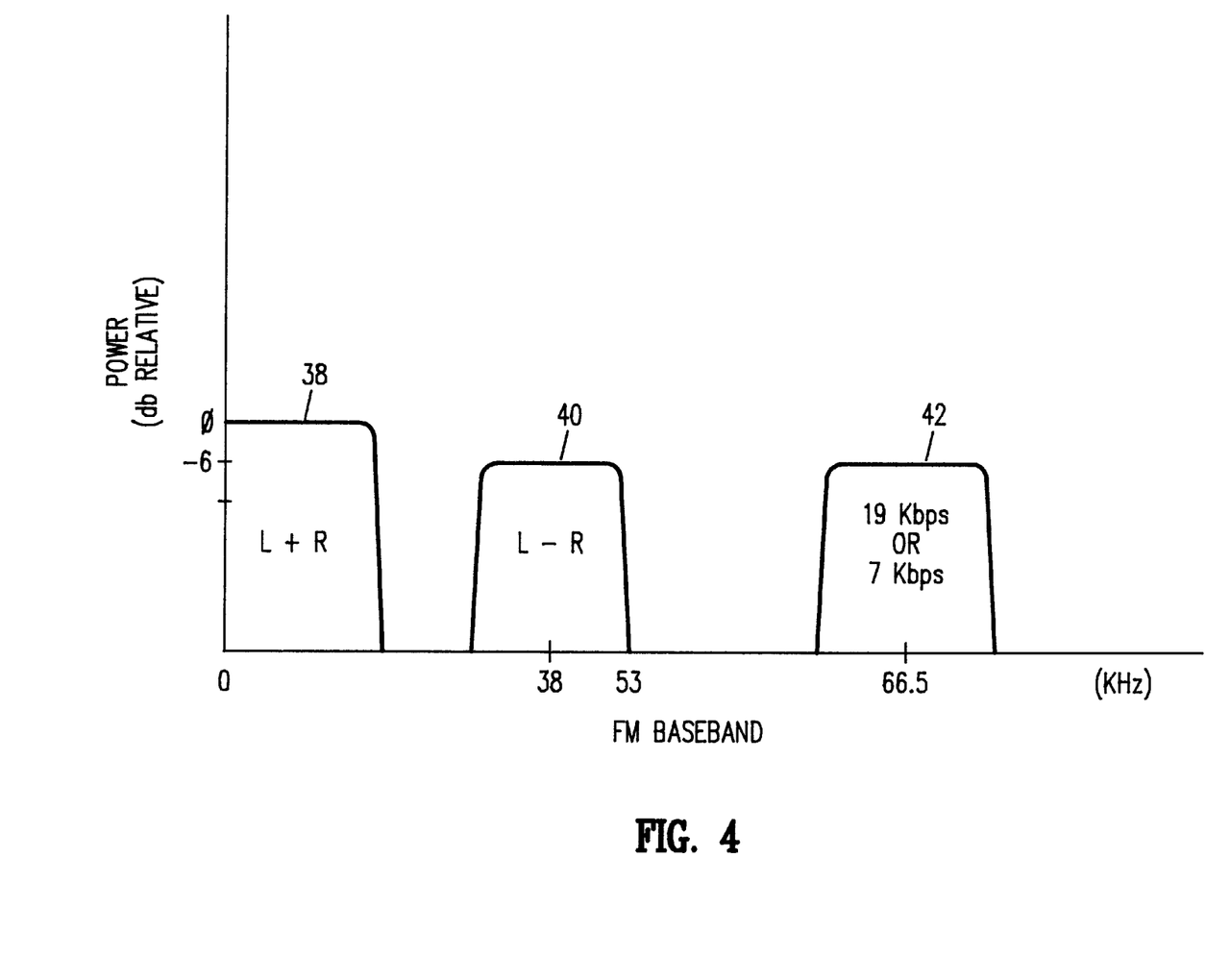
FIG. 4 is a diagram of an FM baseband transmitted from an FM broadcast station including a first subcarrier carrying digital data either at a fast or slow data rate according to the invention.

FIG. 4 is a diagram showing the spectral components of FM signals used in transmissions of both analog radio station broadcasts and digital pager messages according to the invention. Most FM radio stations use the baseband frequencies from 50 hertz (Hz) to 53 kilohertz (kHz) to transmit stereo program material. In such systems, a first channel 38 transmits left plus right channel audio material. A channel 40 then transmits left minus right channel audio material.

The remaining baseband frequencies from 53 kHz up to the legal maximum are typically available for transmission of other data. In the United States, information is transmitted at frequencies up to 100 kHz. In other geographical locations, such as in Europe, FM stations are only transmitted at frequencies up to 75 kHz.

Subcarrier 42 contains a time division multiplexed (TDM) digital message that is transmitted to one or more target receivers. Subcarrier 42 has a center frequency at 66.5 kHz and contains data transmitted at a rate of either 19 kbps or 7 kbps.

As shown above in FIG. 2, the transmitter 28 has a transmission range 18 when messages are transmitted at 19 kbps. To increase effective transmission range in regions with sparse transmission coverage, the signal on subcarrier 42 is transmitted at a slower transmission data rate of 7 kbps. Thus, the effective transmission range is varied according to transmission coverage in a given region to increase reception reliability.

As explained above, systems for transmitting digital pager messages at a single data rate on an FM baseband is known and is, therefore, not described in detail.

In one embodiment of the invention, data on subcarrier 42 is transmitted to a one-way wireless pager receiver. However, the invention can be utilized in any system used to transmit wireless digital information.

Figure 5:
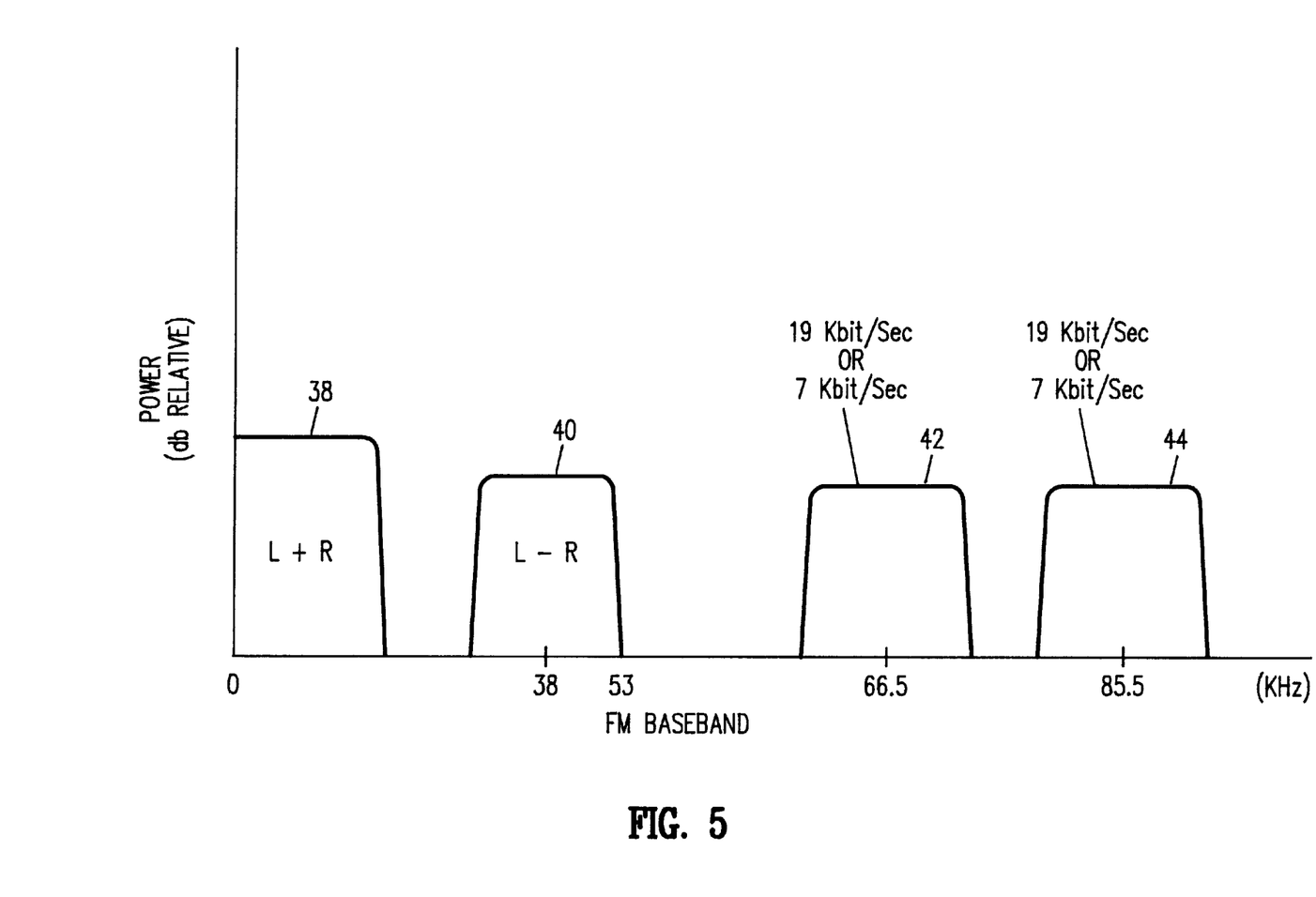
FIG. 5 is a diagram of the FM baseband shown in FIG. 4 including an additional subcarrier containing messages transmitted at a second data rate according to another embodiment of the invention.

FIG. 5 shows another embodiment of the invention where the FM baseband previously shown in FIG. 4 contains two subcarriers 42 and 44. One of the subcarriers 42 or 44 contains messages transmitted at 19 kbps. The other subcarrier contains the same messages transmitted at a slower data rate of 7 kbps.

The receiver 26 (FIG. 2) demodulates either subcarrier 42 or 44 according to the transmission coverage in the region where the receiver is currently located. For example, when the receiver is located in region 12 of FIG. 3 (dense transmission coverage), the receiver demodulates the subcarrier carrying the message transmitted at the faster data rate of 19 kbps. When the receiver moves into region 16 of FIG. 3 (sparse transmission coverage), the receiver demodulates the subcarrier containing messages transmitted at the lower data rate of 7 kbps.

There are a wide variety of transmission protocols that can be used to transmit messages at both a fast and slow data rate. For example, in FIG. 5, two subcarriers carry the same message at two different transmission data rates at the same time. Alternatively, in FIG. 4, a single subcarrier carries the message at the transmission data rate appropriate for the associated region.

Different transmitters in a given region may also transmit the same message at different data rates. For example, a first transmitter in a given region may transmit messages at a high transmission data rate. A second transmitter located in a more remote part of the same region may broadcast the same message at a slow transmission data rate.

Figure 6:
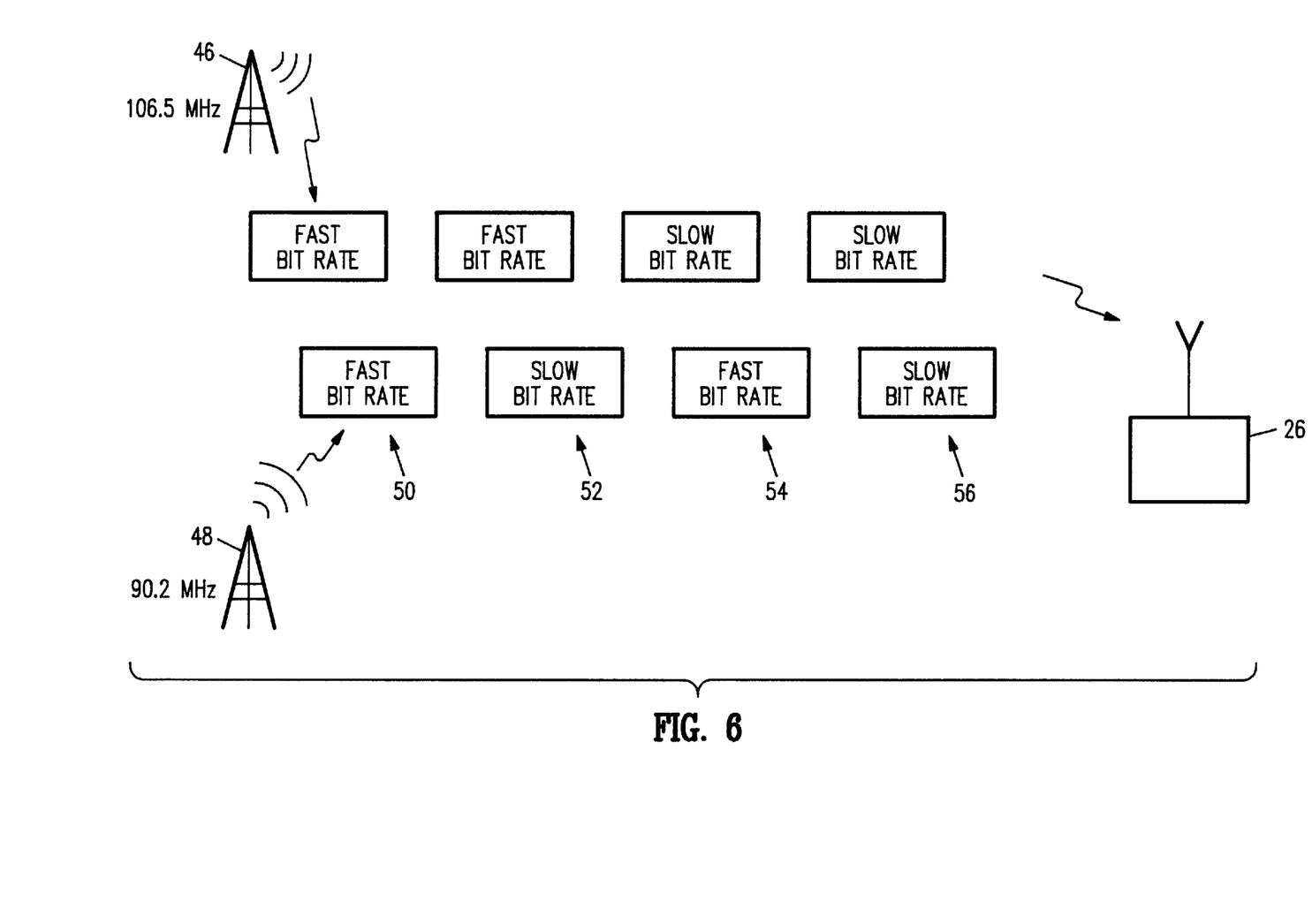
FIG. 6 is a diagram showing the possible transmission data rates for messages sent from two different FM stations.

To explain further, FIG. 6 shows two FM transmitters 46 and 48. The transmitter 46 has a broadcast frequency of 106.5 megahertz (mHz). The transmitter 48 has a broadcast frequency at 90.2 mHz. The FM baseband for transmitters 46 and 48 each include a subcarrier containing digitally encoded messages 50–56.

For a dense coverage region, both transmitters 46 and 48 may transmit messages at the fast bit rate as represented by message 50. In a region with sparse transmission coverage, transmitter 46 may have a fast transmission data rate and transmitter 48 may have a slow transmission data rate as shown by message 52 or visa vera by message 54.

Transmitting messages at both a fast and slow transmission data rate, either on the same channel or from different channels, allow faster data communications when the receiver 26 is within a relatively close range of the transmitter. However, when the transmitter is outside of range 18 (FIG. 2), the receiver 26 can still successfully receive messages at the slower data rate. For regions with extremely sparse transmitter coverage, both transmitter 46 and 48 transmit messages 56 at the slow data rate.

Figure 7:
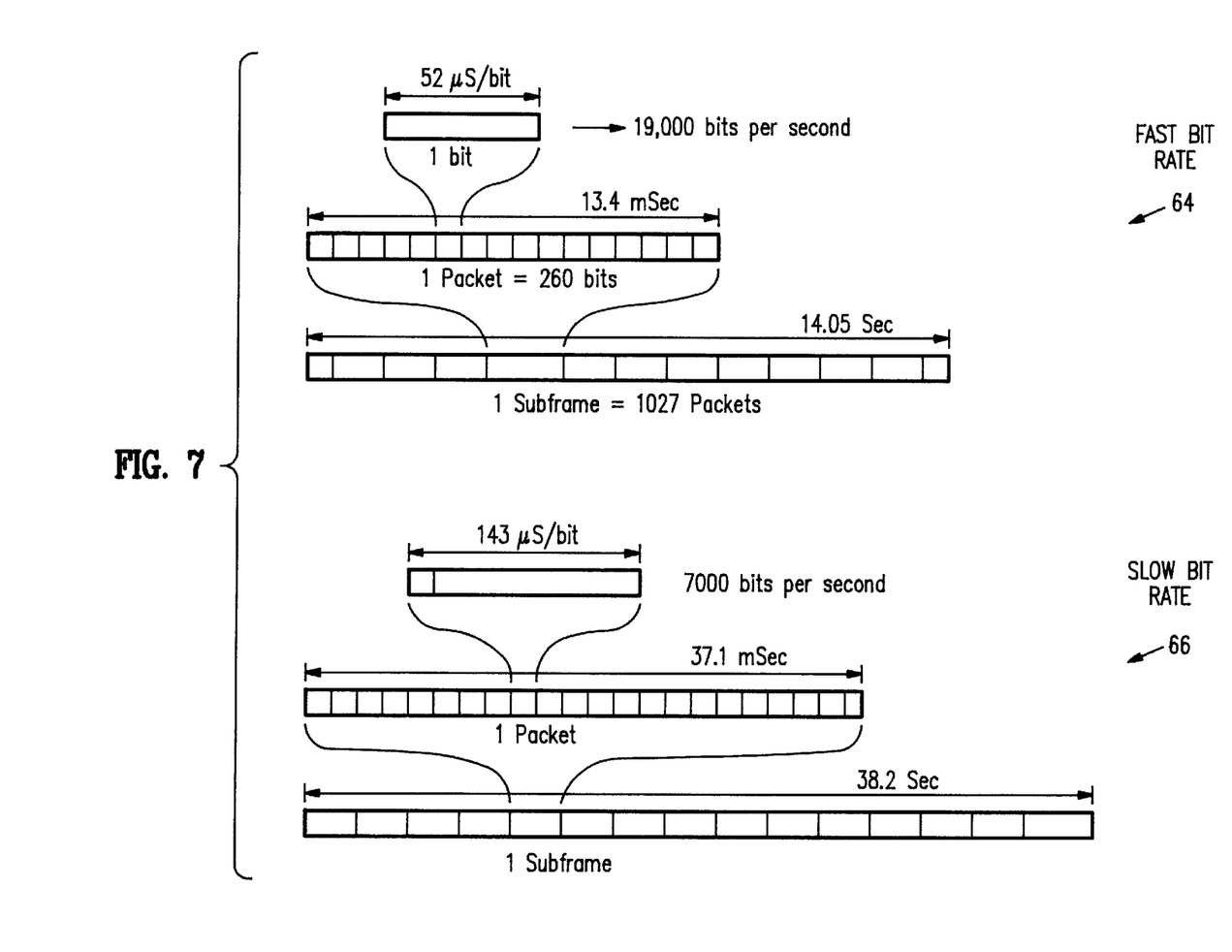
FIG. 7 is a diagram showing the format for messages transmitted at 19,000 bits per second and 7,000 bits per second.

FIG. 7 is a diagram showing the format of the digital messages for both fast and slow transmission data rates. A system for encoding and transmitting digital data into control packets, data packets, subframes and master frames at a single date rate is described in Gaskill and is, therefore, not explained in detail.

Subframe 64 shows the time required to send messages at 19 kbps and subframe 66 shows the time required to send messages at 7 kbps. Each bit in subframe 64 extends for a time of approximately 52 microseconds (ms). Each bit in subframe 66 extends for a time of approximately 143 ms.

It can be seen that the packet and subframe format remains the same for messages sent at either high or low data rates. Thus, present transmitter and receiver systems can be easily adapted to transmit and receive messages at dual data rates. The specific transmission data rate can vary according to the transmitter coverage in a given region and varying system requirements.

Figure 8:
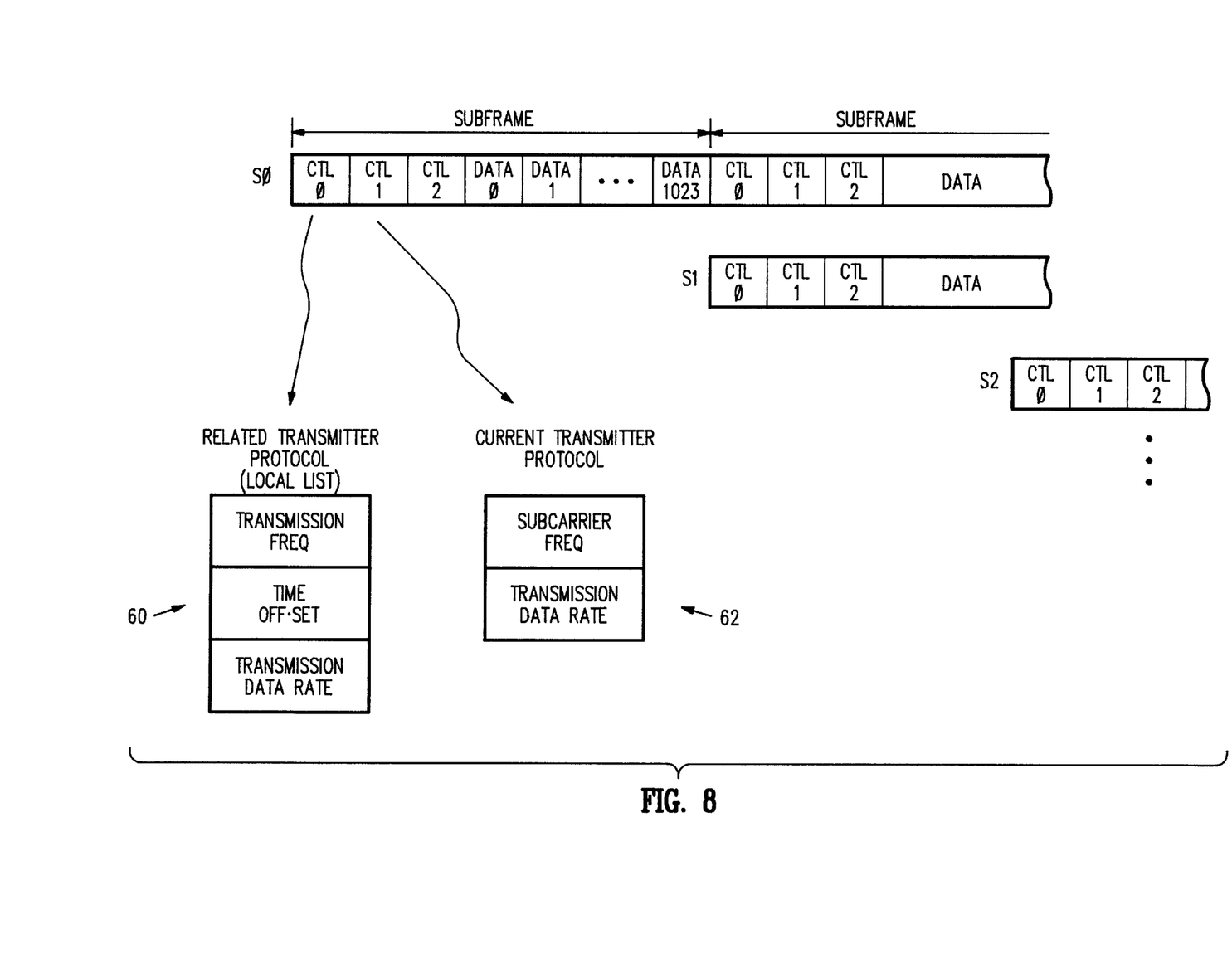
FIG. 8 is a detailed diagram of the format for messages transmitted by the system shown in FIG. 7.

FIG. 8 shows one method for identifying different transmission data rates to a receiver. Each subframe includes multiple control packets (CTL 0–2) and data packets (DATA 0–1023). Multiple subframes are encoded together into a master frame and transmitted on one of the subcarriers 42 or 44 shown in FIGS. 4 and 5. Master frames carrying the same data are sent from different transmitters at different time offsets.

The control packets CTL0–CTL2 for each subframe contain transmitter protocol information 62 that direct the receiver to demodulate messages at the transmission data rate associated with the transmitter. For example, the control packets CTL0–CTL2 contain information regarding the subcarrier frequencies and associated transmission data rates for messages transmitted in the data packets DATA 0–1023. The receiver decodes messages according to the identified subcarrier frequency and transmission data rate.

Control packets CTL0–CTL2 also carry a local list 60 containing transmission data rates for other transmitters in the same region. Specifically, the local list 60 contains the broadcast frequency of adjacent transmitters carrying digitally encoded messages, a time offset which indicates the time delay between transmission of master frames, and the subcarrier frequency and data rate at which the message is transmitted by other transmitters.

By identifying slower transmission data rates, the local list notifies the receiver that the current region may have sparce transmission coverage. The receiver, in turn, can locate messages transmitted at the slower transmission data rate to effectively increase transmission coverage.

Figure 9:
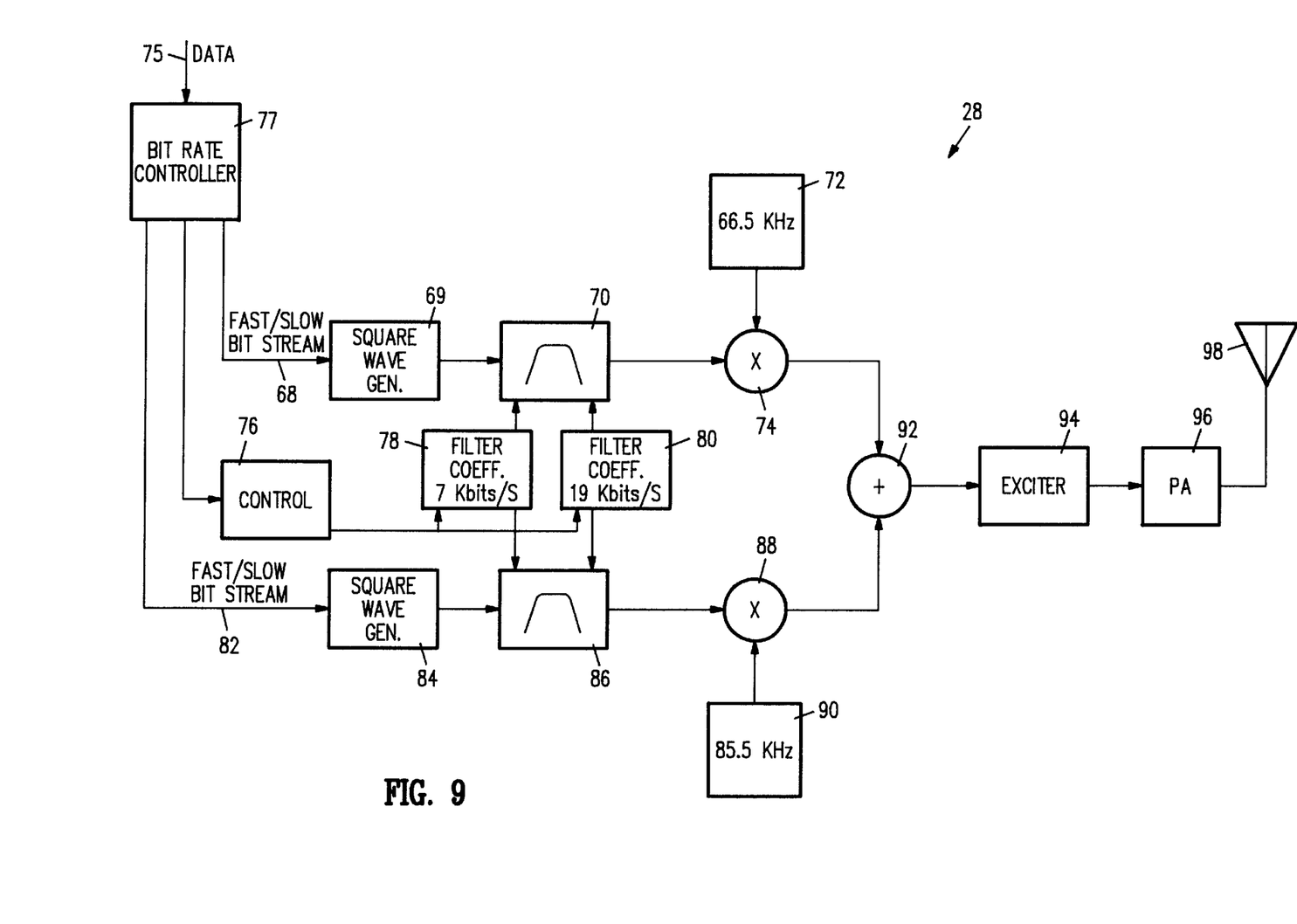
FIG. 9 is a schematic diagram of a transmitter circuit that transmits messages at two different data rates according to the invention.

FIG. 9 is a detailed schematic diagram of the transmitter 28 shown in FIG. 2. Data 75 is first input into a bit rate controller that generates a bit stream at either a fast or slow bit rate according to the required transmission coverage in the region. The bit rate controller 77 communicates the bit rate to a control circuit 76.

A first bit stream 68 having either a fast or slow bit rate is fed into a square wave generator 69. A second bit stream 82 having either a fast or slow bit rate is fed into a square wave generator 84. The square wave generators 69 and 84 transform the bit streams into a series of square waves that are input into shaping filters 70 and 86.

Control circuit 76 selects stored filter coefficients 78 for a slow bit rate (e.g., 7 kbps) or stored filter coefficients 80 for a fast bit rate (e.g., 19 kbps). The filter coefficients 78 and 80 are selected by the control circuit 76 according to the rate of the bit streams 68 and 82 received from bit rate controller 77.

Filter 70 is coupled to multiplier 74 and filter 86 is coupled to multiplier 88. Multiplier 74 moves the data signal onto a first subcarrier frequency at 66.5 kHz. Multiplier 88 moves the data signal from filter 86 onto a subcarrier frequency at 85.5 kHz. Square wave generator 69, shaping filter 70 and multiplier 74 are defined as a first transmitter channel. Square wave generator 84, shaping filter 86 and multiplier 88 are defined as a second transmitter channel.

The outputs from the two transmitter channels are combined by adder 92 and output to an exciter 94 that adds the main audio program material and generates the transmission signal at a given broadcast frequency. The transmission signal is then amplified by a power amplifier 96 and output from antenna 98.

It is important to note that transmitter 28 can transmit messages at either a fast or slow data rate on either the 66.5 kHz subcarrier or the 85.5 kHz subcarrier. Thus, the transmitter has the flexibility to adapt to different FM baseband constraints in different regions. For example, if the transmitter region has both the 66.5 and 85.5 kHz subcarriers available in the FM baseband, the transmitter can transmit the message at both the fast and slow data rates at the same time or selectively on either subcarrier.

If only one subcarrier is available on the FM baseband, the transmitter sends messages on a single subcarrier at either the fast data rate or the slow data rate according to regional transmission coverage.

Information identifying the subcarrier transmission frequency and transmission data rate can be contained in control packets as described above in FIG. 8. Alternatively, the receiver contains a clock extraction circuit that identifies the transmission data rate.

Figure 10:
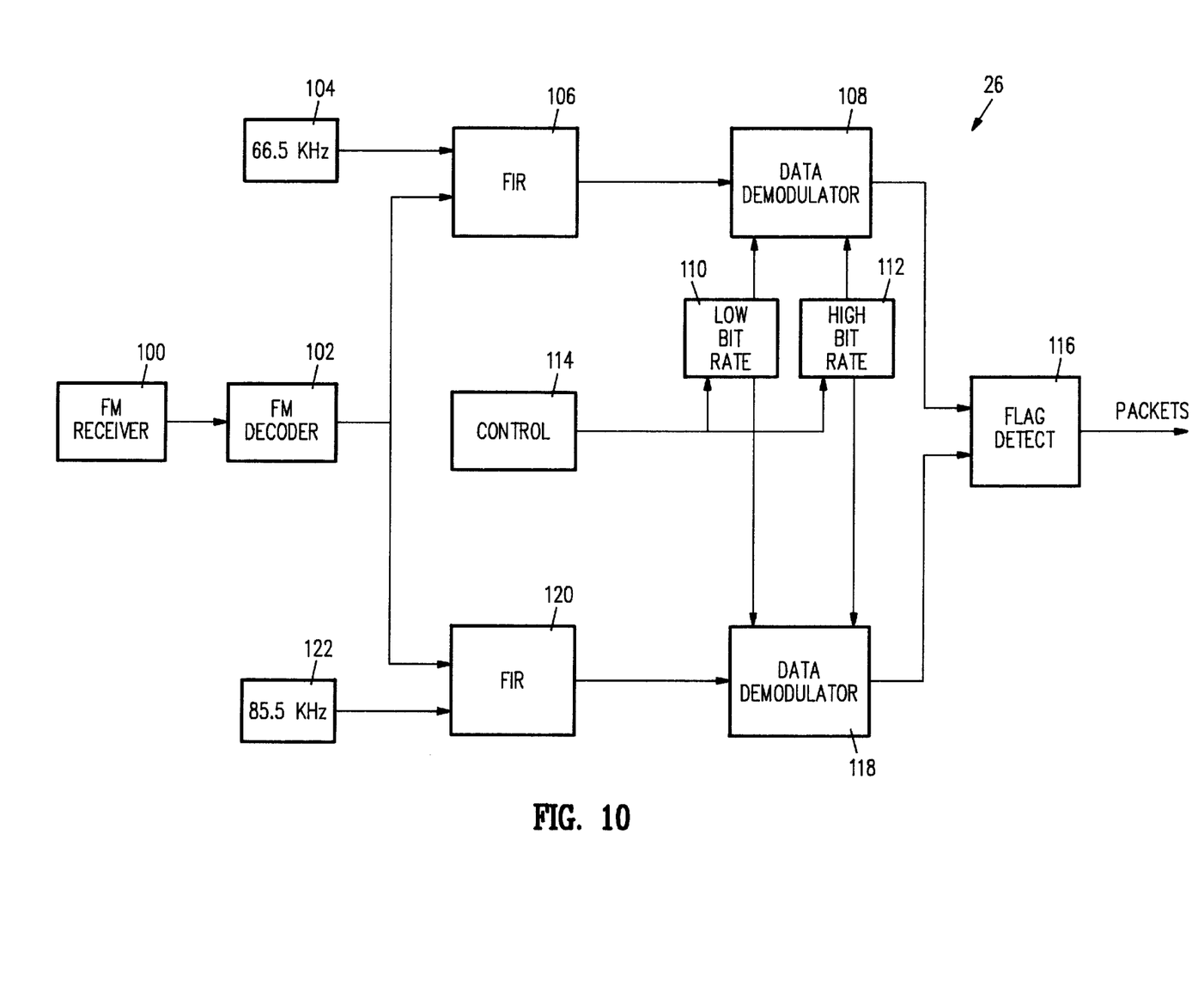
FIG. 10 is a schematic diagram of a receiver that decodes messages at two different data rates according to the invention.

FIG. 10 is a detailed schematic diagram of the receiver 26 (FIG. 2) used for receiving messages at dual transmission data rates. The receiver includes a tunable FM receiver circuit 100 that selectively tunes to different FM broadcast frequencies. The signal at the tuned frequency is fed into FM decoder 102 extracting the FM baseband shown in FIGS. 4 and 5.

A finite impulse response (FIR) filter 106 filters the 66.5 Khz subcarrier from the FM baseband and FIR 120 filters the 85.5 kHz subcarrier from the FM baseband. Data demodulators 108 and 118 selectively demodulate the signals on the 66.5 Khz subcarrier and 85.5 Khz subcarrier, respectively, at either the low or high bit rate.

A control circuit 114 decodes information in the control packets that may identify the subcarrier frequency and the associated transmission data rate. The control circuit 114 accordingly connects either oscillator 110 or oscillator 112 to demodulators 108 and 118. Oscillator 110 is used for demodulating the subcarriers at the low bit rate and frequency oscillator 118 is used for demodulating the subcarriers at the high bit rate.

Alternatively, the demodulators 108 and 118 contain a clock extraction circuit that identifies the transmission data rate for messages on the two subcarriers. The demodulators then automatically demodulate the subcarriers at the transmitted data rate. By using a clock extraction circuit, the receiver is not required to extract the transmission data rate from the control packets.

Flag detect circuit 116 decodes the subframes to identify messages directed to receiver 26. Accordingly, receiver 26 decodes the message packets and appropriately displays or processes the data. The flag detection circuitry and additional control circuitry is well known and, therefore, not explained in detail.

The system described above increases communication reliability in regions having different transmitter coverage by automatically varying the transmission data rate. Varying transmission data rate accordingly changes the range in which a receiver can successfully receive messages from a given transmitter. The invention can be used in existing digital message formats with minimal changes to the transmitter and receiver circuitry. Thus, the invention is easily incorporated into existing wireless communication systems.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A wireless paging system that transmits digital messages on an FM baseband, comprising:
    a transmitter circuit having at least one of a first and a second transmission data rate, the second transmission data rate being slower than the first data rate; and
    a pager receiver that receives messages at both the first and second transmission data rate and selectively decodes the messages at one of said first transmission data rate and said second transmission data rate according to a given transmission coverage in a geographical region,
    wherein the transmitter circuit includes a first transmitter channel for transmitting a first subcarrier containing the message at one of said first and second transmission data rates and a second transmission channel for generating a second subcarrier containing the message at one of said first and second transmission data rates.

2. A radio paging system according to claim 1 including summing means coupled to the first and second transmission channels for combining the first subcarrier and the second subcarrier on the same FM baseband.

3. A radio paging system according to claim 1 including a control circuit coupled to both the first and second transmitter channel, the control circuit selectively transmitting the messages at one of said first and second transmission data rates on both the first and second subcarrier.

4. A radio paging system according to claim 1 wherein the first subcarrier is centered at 66.5 kilohertz and the second subcarrier is centered at 85.5 kilohertz.

5. A radio paging system according to claim 1 wherein the receiver comprises a first filter for isolating messages on the first subcarrier and a second filter for isolating messages on the second subcarrier.

6. A radio paging system according to claim 5 wherein the receiver further includes a first demodulator coupled to the first filter and a second demodulator coupled to the second filter.

7. A radio paging system according to claim 6 wherein the receiver further includes a high frequency oscillator and low frequency oscillator each coupled to the first and second demodulator.

8. A radio paging system according to claim 1 wherein the receiver includes the following:
    a demodulator;
    a high frequency oscillator circuit;
    a low frequency oscillator circuit; and
    a control circuit coupled to the demodulator for selectively coupling one of said high frequency oscillator circuit and said low frequency oscillator circuit to the demodulator according to the transmission data rate.

9. A radio paging system according to claim 8 including a filter circuit coupled to the demodulator for separating multiple subcarrier frequencies from the FM baseband.

10. A method for varying an effective transmission range for transmitters in a wireless communication system, comprising:
    transmitting messages at a first transmission data rate;
    transmitting the same messages at a second transmission data rate slower than the first transmission data rate;
    receiving messages at both the first and second transmission data rate;
    decoding messages at one of said first transmission data rate and said second transmission data rate to selectively vary the effective range over which the messages can be received from the transmitter, and
    including transmitting messages at the first transmission data rate on a first subcarrier on a given broadcast channel and transmitting messages at the second transmission data rate on a second subcarrier on the same broadcast channel.

11. A method according to claim 10 including transmitting messages at the first and second transmission data rate at a single subcarrier frequency from different transmitters.

12. A wireless communication system with variable transmission range, comprising
    multiple transmitters having at least one of a first and second transmission bit rate; and
    a receiver including means for selectively decoding messages from the multiple transmitters at both the first transmission bit rate and the second transmission bit rate according to transmission coverage in a given region,
    wherein the receiver comprises the following:
        a first filter for extracting messages at a first subcarrier frequency;
        a second filter for extracting messages at a second subcarrier frequency;
        a first demodulator coupled to the first filter; and
        a second demodulator coupled to the second filter,
        the first and second demodulators selectively demodulating the first and second subcarrier at one of said first and said second transmission bit rate.

* * * * *